United States Patent [19]
Halfon et al.

[11] Patent Number: 4,881,606
[45] Date of Patent: Nov. 21, 1989

[54] POINT-OF-SALE APPARATUS

[75] Inventors: Yosef Halfon, Kfar Saba; Uzi Hadar, Kibbutz Beit Keshet, both of Israel

[73] Assignee: Shekel Electronics-Scales Beit Keshet ·Electronics (Registered Partnership), Lower Galilee, Israel

[21] Appl. No.: 301,413

[22] Filed: Jan. 25, 1989

[30] Foreign Application Priority Data
Jul. 15, 1988 [IL] Israel .................................. 87114

[51] Int. Cl.$^4$ ..................... G01G 21/00; G01G 21/28; G01G 19/00
[52] U.S. Cl. .................................. 177/126; 177/239; 177/245
[58] Field of Search ............... 177/126, 161, 162, 238, 177/239, 244, 245, 262

[56] References Cited
U.S. PATENT DOCUMENTS
4,487,276 12/1984 Swersey et al. ................ 177/126 X
4,700,656 10/1987 Cone et al. ...................... 177/245

Primary Examiner—George H. Miller, Jr.
Attorney, Agent, or Firm—Benjamin J. Barish

[57] ABSTRACT

Point-of-sale apparatus to be used with an optical scanner for identifying the articles sold, comprises housing to be placed over the optical scanner, a light-transparent window carried by the housing so as to be aligned with the optical scanner when the housing is placed thereover, a weighing scale carried by the housing to weigh the article identified by the optical scanner, and a display for displaying the weight and/or the price of each article identified by the optical scanner and weighed by the weighing scale.

20 Claims, 1 Drawing Sheet

U.S. Patent
Nov. 21, 1989
4,881,606
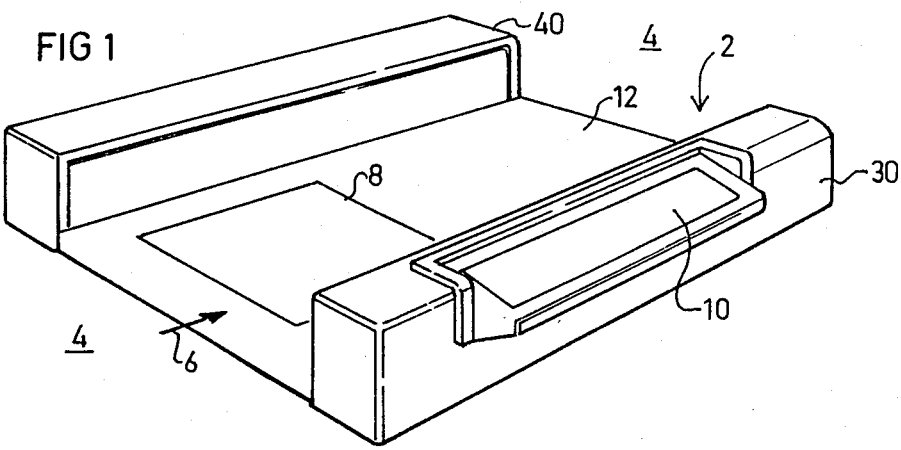
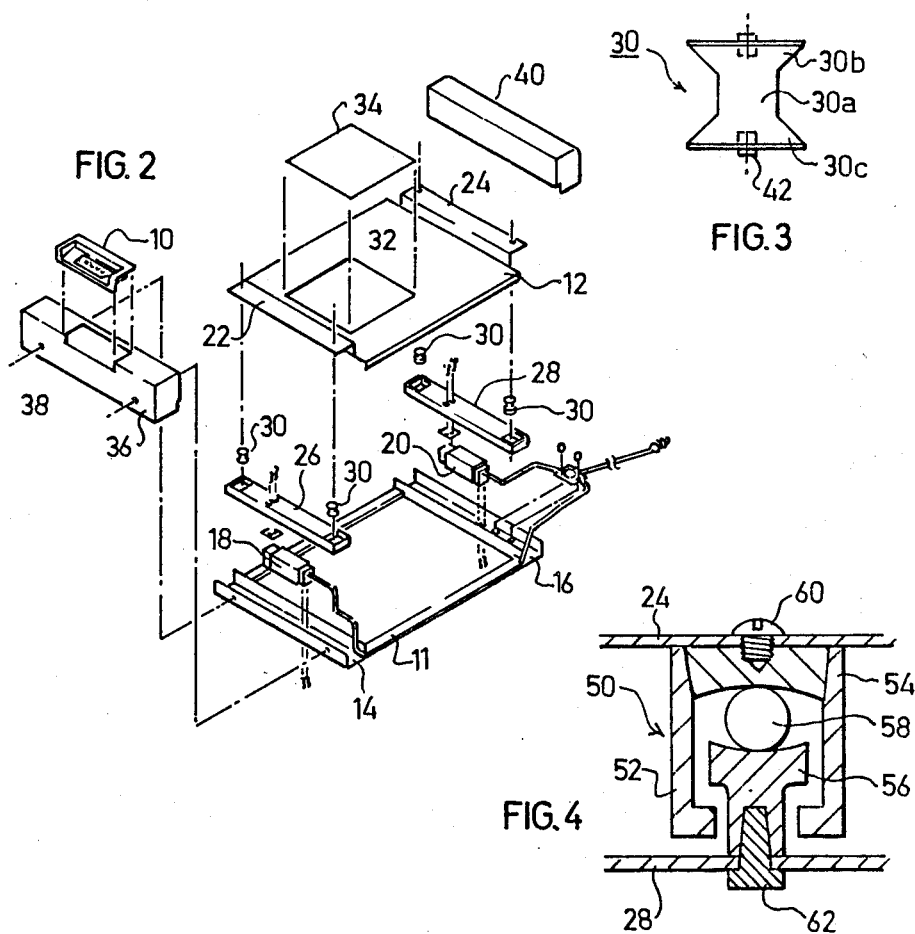

POINT-OF-SALE APPARATUS

BACKGROUND OF THE INVENTION

The present invention relates to point-of-sale apparatus, and particularly to apparatus to be used at a point-of-sale, such as a check-out counter for identifying and weighing the articles being purchased in order to compute their prices.

Supermarkets and other retail stores now commonly include check-out counters having optical scanners which identify the purchased articles, e.g., by a bar code, and weighing scales which weigh the articles in order to compute their prices. At the present time, the weighing scale is usually separate and distinct from the optical scanner, so that the check-out clerk first places the article over the optical scanner to identify the article, and then places the article on the weighing scale to determine its weight and its price. This requires separate manipulations of each article, which thereby substantially increases the overall time required by a clerk for checking-out a large number of purchased articles.

Point-of-sale apparatus is also known which includes both an optical scanner and a weighing scale and which enables the clerk to perform both the identification and weighing operations at the same time. Such known apparatus, however, is very expensive, and therefore its use is very limited.

An object of the present invention is to provide point-of-sale apparatus having advantages in the above respects.

BRIEF SUMMARY OF THE INVENTION

According to the present invention, there is provided point-of-sale apparatus to be used with an optical scanner for identifying the articles sold, comprising: a housing to be placed over the optical scanner; a light-transparent window carried by the housing so as to be aligned with the optical scanner when the housing is placed thereover; a weighing scale carried by the housing to weigh the article identified by the optical scanner; and a display for displaying the weight and/or the price of each article identified by the optical scanner and weighed by the weighing scale.

It will thus be seen that the point-of-sale apparatus constructed in accordance with the invention enables the clerk to perform both the article-identification and the article-weighing at the same time, thereby substantially decreasing the time for checking-out a large quantity of sold articles. In addition, the apparatus of the invention may be used with an existing optical scanner with which the retail store may already be equipped, and therefore reduces the overall cost in providing the retail store with this more efficient and speedy means for performing the check-out operations.

An embodiment of the invention is described below for purposes of example. According to further features in this described embodiment, the weighing scale comprises a weighing platform secured to the housing and formed with the window; also, the weighing platform is supported at its opposite ends on a pair of load cells which measure the weight of the weighing platform and the article thereon, and output electrical signals representing the weight. In addition, the weighing platform is formed with a pair of ledges at its opposite ends, which ledges are supported on a pair of weight-receiving beams each overlying one of the load cells.

In the described embodiment, the weighing platform is supported by the two weight-receiving beams via four resilient pads, two resilient pads being interposed between each of the two opposite ends of the weighing platform and the respective weight-receiving beam.

A modification is also described wherein a ball bearing assembly is used for some or all of the resilient pads. Preferably, one end of the weighing platform is supported by two resilient pads, and the opposite end is supported by two of such ball bearing assemblies. It has been found that better accuracy is obtained with such an arrangement, since the ball bearings transmit the forces from the weighing platform to their respective load cell only in the vertical direction.

Further features and advantages of the invention will be apparent from the description below.

BRIEF DESCRIPTION OF THE DRAWINGS

The invention is herein described, by way of example only, with reference to the accompanying drawings, wherein:

FIG. 1 is three-dimensional view illustrating one form of apparatus constructed in accordance with the invention;

FIG. 2 is an exploded view illustrating the main components of the apparatus of FIG. 1;

FIG. 3 illustrates construction of one of the four resilient pads in the apparatus illustrated in FIG. 2; and FIG. 4 illustrate the construction of a ball bearing assembly which may be used for some (preferably two) of the resilient pads illustrated in FIG. 2.

DESCRIPTION OF A PREFERRED EMBODIMENT

The apparatus illustrated in the drawings is intended to be used with an existing optical scanner with which the retail store may already be equipped. The apparatus thus converts the optical scanner to a more efficient point-of-sale apparatus in which the optical scanner identifies the articles sold, and the weighing scale provided by the apparatus weighs the article at the same time the articles is identified, thereby substantially decreasing the time for checking-out a large quantity of purchased articles.

The illustrated apparatus comprises a housing, generally designated 2, to be placed on the check-out counter 4 to overlie an optical scanner (not shown) included in the check-out counter so as to scan the bar code provided on each article when placed on, or passed over, a predetermined location on the check-out counter. In the arrangement illustrated in FIG. 1, the articles are moved during a check-out operation in the direction of the arrow 6, i.e., from left-to-right.

Housing 2 includes a light transparent window 8 carried by the housing so as to be aligned with the optical scanner when the housing is placed thereon. Housing 2 further includes a weighing scale, as will be described more particularly below with respect to FIG. 2, to weigh the article identified by the optical scanner, and a display 10 for displaying the weight and/or the price of each article identified by the optical scanner and weighed by the weighing scale.

Since the illustrated apparatus uses an existing optical scanner which the retail store has already installed, or which it would install with the installation of the apparatus of the present invention, the optical scanner is not described herein. It will be appreciated that the illustrated apparatus can be used with many of the existing optical scanners, such as those including a movable laser beam, or a fixed laser beam, scanning the bar code on the purchased articles in order to identify the purchased article.

FIG. 2 more particularly illustrates the construction of the apparatus including the weighing scale incorporated therein for weighing the articles during a check-out operation.

As shown in FIG. 2, housing 2 comprises a base plate 11 and a weight-receiving platform 12 supported on the base plate. Base plate 11 is formed with a pair of channels 14, 16 at its opposite ends, each for receiving a load cell 18, 20. The weight-receiving platform 12 is supported on the load cells 18, 20, so that the load cells output electrical signals corresponding to the weight of the articles placed on the platform. For this purpose, platform 12 is integrally formed with a pair of ledges 22, 24 at its opposite sides, which ledges are supported on weight-receiving beams 26, 28 interposed between the ledges and the underlying load cells 18, 20. Each of the weight-receiving beams 26, 28 includes a resilient pad 30 at each of its two opposite ends which pads are secured between the weight-receiving beams 26, 28 and the undersides of the ledges 22, 24 of the weight-receiving platform 12.

The weight-receiving platform 12 is formed with a rectangular opening 32 occupied by a light-transparent window 34, which opening and window are aligned with the optical scanner incorporated in the check-out counter 4, as described earlier. Accordingly, when the article to be checked-out is placed on window 34 over the optical scanner, the optical scanner scans the bar code on the article to identify it, and at the same time the weight of the article is transferred from platform 12 to the load cells 18, 20 which cells weigh the article, so that both the identification and weighing steps are performed concurrently.

Housing 2 further includes a front rectangular section 36 attachable to base plate 16. The front section 36 is formed with a rectangular opening 38 underlying the display 10, so that the weight and/or price of the article being checked out is viewable to the clerk. Housing 2 further includes a rear rectangular section 40 attachable to the rear part of the base plate 16. Both the front section 36 and the rear section 40 project outwardly from the plane of the weight-receiving platform 12, and thereby guide the movement of the articles to the platform, particularly to its transparent window 34, during the check-out operations.

FIG. 3 illustrates the construction of one of the four resilient pads 30. Thus, as shown in FIG. 3, the resilient pad 30 is of solid rubber construction, having an inner cylindrical section 30a, and frusto-conical end sections 30b, 30c. Each end section has a metal insert 40, 42 embedded therein for receiving the fasteners used for attaching the resilient pad between the ledges 22, 24 and the weight-receiving beams 26, 28, as shown in FIG. 2.

FIG. 4 illustrates a ball bearing assembly, generally designated 50, which may be used for the resilient pads 30. Preferably, two such ball bearing assemblies 50 are used for mounting ledge 24 of the weighing platform 12 to the weight-receiving beam 28 overlying load cell 20, whereas the above-described resilient pads 30, illustrated in FIG. 3, are used for mounting ledge 22 at the other end of the weighing platform 12 to its respective weight-receiving beam 26 overlying load cell 18.

As shown in FIG. 4, each of the ball bearing assemblies 50 comprise a housing 52, a pair of curved end bearings 54, 56 within the housing, and a ball bearing 58 interposed between the end bearings 54, 56. Assembly 50 further includes fastener inserts 60, 62 at its opposite ends for securing the assembly between the weighing platform ledge 24' and the weight- receiving beam 28'. Housing 52 is preferably metal, such as brass, while the end bearings 54, 56, and the ball bearing 58 are of hard metal.

It has been found that when one end of the weighing platform 12, e.g., that secured to the weight-receiving beam 28, includes two such ball bearing assemblies, whereas the opposite end of the weighing platform, e.g., that secured to the weight-receiving beam 26, includes two resilient pads such as shown at 30 in FIG. 3, improved accuracy is obtained in the readings produced by the apparatus, since the ball bearing assemblies 50 transfer the respective forces from the weighing scale 12 to their respective load cells in the vertical direction only.

The manner of using the apparatus illustrated in the drawings will be apparent from the above description. Thus, housing 2 of the apparatus is attached to the normal checked-out counter 4 such that its window 8 overlies the optical scanner (not shown) built-into the check-out counter. During a check-out operation, the clerk moves each article in the direction of arrow 6 (FIG. 1) to the window 8, with the identifying bar code of the article facing downwardly, so that the optical scanner can read the bar code and thereby identify the article. At the same time, the weight of the article is sensed by the load cells 18, 20 supporting the weight-receiving platform 12, which load cells output electrical signals representing the weight of the article placed on the platform. Any suitable computer normally provided for this purpose can be used for computing the price of the so-weighed and identified article. This price, with or without the weight, is displayed in the display 10.

It will thus be seen that the illustrated apparatus enables both the identification and the weighing steps to be performed concurrently, thereby substantially speeding-up the checking-out operation particularly when checking-out a large number of purchased articles. In addition, the disclosed apparatus enables existing optical scanners to be used, thereby reducing the cost of providing the retail establishment with this more efficient procedure for performing its check-out operations.

While the invention has been described with respect to a preferred embodiment, it will be appreciated that many variations may be made. For example, the display may be included in a remote unit electrically coupled to the weighing scale. Many other variations, modifications and applications of the invention may be made.

What is claimed is:

1. Point-of-sale apparatus to be used with an optical scanner for identifying the articles sold, comprising:
   a housing to be placed over the optical scanner;
   a light-transparent window carried by said housing so as to be aligned with the optical scanner when the housing is placed thereover;
   a weighing scale carried by said housing to weigh the article identified by the optical scanner;
   and a display for displaying the weight and/or the price of each article identified by the optical scanner and weighed by the weighing scale.

2. The apparatus according to claim 1, wherein said weighing scale comprises a weighing platform secured to said housing and formed with said window.

3. The apparatus according to claim 2, wherein said weighing platform is supported at its opposite ends on load cells which measure the weight of the weighing platform and the article thereon, and output electrical signals representing said weight.

4. The apparatus according to claim 3, wherein said weighing platform is formed with a pair of ledges at its opposite ends, which ledges are supported on a pair of weight-receiving beams each overlying one of said load cells.

5. The apparatus according to claim 4, further including resilient pads interposed between said weight-receiving beams and said ledges.

6. The apparatus according to claim 4, wherein each of said ledges of the weighing platform is supported by its respective weight-receiving beam via two resilient pads interposed between the opposite ends of the ledge and the respective weight-receiving beam.

7. The apparatus according to claim 4, wherein one of said ledges of the weighing platform is supported by its respective weight-receiving beam via two resilient pads interposed between the opposite ends of the ledge and the respective weight-receiving beam, and the other ledge of the weighing platform is supported by its respective weight-receiving beam via two ball bearing assemblies interposed between the opposite ends of the ledge and the respective weight-receiving beam.

8. The apparatus according to claim 7, wherein each of said ball bearing assemblies includes a housing, a pair of curved end bearings within the housing, and a ball bearing interposed between said pair of curved end bearings.

9. The apparatus according to claim 4, wherein said housing further includes a base plate formed with a pair of channels at its opposite ends, each for receiving one of said load cells.

10. The apparatus according to claim 1, wherein said display is disposed in an opening extending along the front of the housing.

11. Point-of-sale apparatus to be used with an optical scanner for identifying the articles sold, comprising a housing including:
   a base plate of rectangular configuration;
   a pair of load cells each supported along one end of the base plate;
   a pair of weight-receiving beams each supported on one of said load cells;
   and a weighing platform supported on said pair of weight-receiving beams;
   said weighing platform being formed with a rectangular opening occupied by a light-transparent window adapted to be aligned with the optical scanner when the housing is placed thereover.

12. The apparatus according to claim 11, further including a display for displaying the weight and/or the price of each article identified by the optical scanner and weighed by the weighing platform.

13. The apparatus according to claim 11, wherein said weighing platform is formed with a pair of ledges at its opposite ends, which ledges are supported on said weight-receiving beams.

14. The apparatus according to claim 11, wherein said base plate is formed with a pair of channels at its opposite ends for receiving said pair of load cells.

15. The apparatus according to claim 11, wherein each end of said weighing platform is supported on its respective weight-receiving beam via two resilient pads.

16. The apparatus according to claim 11, wherein one end of said weighing platform is supported on its respective weight-receiving beam via two resilient pads, and the other end of the weighing platform is supported on its respective weight-receiving beam via two ball bearing assemblies.

17. The apparatus according to claim 16, wherein each of said ball bearing assemblies includes a housing, a pair of curved end bearings within the housing, and a ball bearing interposed between said pair of curved end bearings.

18. Point-of-sale apparatus to be used with an optical scanner for identifying the articles sold, comprising a housing including:
   a base plate of rectangular configuration;
   a pair of load cells each supported along one end of the base plate;
   a pair of weight-receiving beams each supported on one of said load cells;
   and a weighing platform supported on said pair of weight-receiving beams;
   said weighing platform being formed with a rectangular opening occupied by a light-transparent window adapted to be aligned with the optical scanner when the housing is placed thereover;
   one end of said weighing platform being supported on one of the weight-receiving beams by a pair of resilient pads;
   the opposite end of the weighing platform being supported on the other of said weight-receiving beams by a pair of ball bearing assemblies.

19. The apparatus according to claim 18, wherein each of said rubber pads is of solid rubber construction, and wherein each of said ball bearing assemblies includes a housing, a pair of curved end bearings within the housing, and a ball bearing interposed between the pair of curved end bearings.

20. The apparatus according to claim 18, further including a display for displaying the weight and/or the price of each article identified by the optical scanner and weighed by the weighing scale.

* * * * *